United States Patent
Nakao et al.

(10) Patent No.: US 11,334,934 B2
(45) Date of Patent: May 17, 2022

(54) ITEM PRESENTATION METHOD, ITEM PRESENTATION PROGRAM, AND ITEM PRESENTATION APPARATUS

(71) Applicant: FUJITSU LIMITED, Kawasaki (JP)

(72) Inventors: Yuri Nakao, Kawasaki (JP); Kotaro Ohori, Chuo (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/821,355

(22) Filed: Mar. 17, 2020

(65) Prior Publication Data

US 2020/0302507 A1 Sep. 24, 2020

(30) Foreign Application Priority Data

Mar. 20, 2019 (JP) .............................. JP2019-053094

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0631* (2013.01); *G06Q 30/0201* (2013.01); *G06Q 30/0202* (2013.01); *G06Q 30/0633* (2013.01)

(58) Field of Classification Search
CPC .............. G06Q 30/08; G06Q 30/0631; G06Q 30/0201; G06Q 30/0202; G06Q 30/0633
(Continued)

(56) References Cited

U.S. PATENT DOCUMENTS 10,127,596 B1 * 11/2018 Franke ................ G06Q 30/0627

10,572,555 B1 * 2/2020 Franke ............... G06Q 30/0625
(Continued)

FOREIGN PATENT DOCUMENTS

CN 101999121 A * 3/2011 ........... G06F 16/435
CN 111242748 A * 6/2020
(Continued)

OTHER PUBLICATIONS

Park, Jihoi. "Group Recommender System for Store Product Placement." Data Mining and Knowledge Discovery, Nov. 23, 2018, link.springer.com/article/10.1007/s10618-018-0600-z?error=cookies_not_supported&code=abfc0e0c-aced-4f05-8a64-cc9c9a622ad8.*
(Continued)

*Primary Examiner* — Mila Airapetian
(74) *Attorney, Agent, or Firm* — Fujitsu Patent Center

(57) ABSTRACT

An item presentation method implemented by a computer, the item presentation method includes: executing a selection processing that includes selecting a plurality of candidate items that are presentation candidates from a plurality of items, based on a preference of a user; executing a calculation processing that includes calculating the number of new items newly presented among the plurality of candidate items by referring to an item presentation history to the user; executing a decision processing when the number of new items is a predetermined number or less, the decision processing including deciding, as a recommendation item, an item located away from the preference in an item space about the preference by a distance less than a threshold value; and executing a presentation processing that includes selecting a presentation item presented to the user from the plurality of candidate items and the recommendation item, and presenting the selected presentation item.

7 Claims, 17 Drawing Sheets

(58) Field of Classification Search
USPC ...................................... 705/26.1–27.2, 26.7
See application file for complete search history.

(56) References Cited

U.S. PATENT DOCUMENTS

| | | | | |
|---|---|---|---|---|
| 2007/0276803 | A1* | 11/2007 | Shakib | G06F 16/951 |
| 2014/0012794 | A1* | 1/2014 | Dillon | G06N 5/04 |
| | | | | 706/46 |
| 2019/0205481 | A1* | 7/2019 | Gutnik | G06F 16/9024 |
| 2020/0234314 | A1* | 7/2020 | Christiansen | G06Q 30/0269 |

FOREIGN PATENT DOCUMENTS

| | | | | |
|---|---|---|---|---|
| JP | 2012-098975 | A | | 5/2012 |
| JP | 2012098975 | A | * | 5/2012 |
| JP | 2016-071881 | A | | 5/2016 |
| JP | 2016071881 | A | * | 5/2016 |
| JP | 6065907 | B2 | * | 1/2017 ......... G06F 3/04842 |

OTHER PUBLICATIONS

Wang, Di, et al. "Online support vector machine based on convex hull vertices selection." IEEE transactions on neural networks and learning systems 24.4 (2013): 593-609. (Year: 2013).*

* cited by examiner

FIG. 5

| REAL ESTATE NAME | TRAFFIC | SHOPPING | SCHOOL | SECURITY |
|---|---|---|---|---|
| A CONDOMINIUM | FIVE MINUTES ON FOOT XX STATION | LARGE SUPERMARKET STORE IN DISTRICT | X MINUTES ON FOOT TO NEAR ELEMENTARY SCHOOL | NUMBER OF MINOR OFFENCES X CASES/YEAR |
| ... | ... | ... | ... | ... |

FIG. 6

|  | FIRST TIME | SECOND TIME | ... |
|---|---|---|---|
| NUMBER OF NEW ITEMS | 8 | 5 | ... |

FIG. 7

ITEM PRESENTATION METHOD, ITEM PRESENTATION PROGRAM, AND ITEM PRESENTATION APPARATUS

CROSS-REFERENCE TO RELATED APPLICATION

This application is based upon and claims the benefit of priority of the prior Japanese Patent Application No. 2019-53094, filed on Mar. 20, 2019, the entire contents of which are incorporated herein by reference.

FIELD

The embodiments discussed herein are related to an item presentation method, an item presentation program, and an item presentation apparatus.

BACKGROUND

A technique of presenting a plurality of options and items to the user on Web pages or the like to search for the preference of the user based on the user's response has been known. For example, when the user searches for places and real estate to live, it is known to interactively detect and recommend a preference while displaying the user's liking such that the user may find a true preference. Additionally, for example, in a system for searching for items identified in terms of a set of attributes in an item space, the set of attributes is selected so as to present the proper number of items to the user.

Examples of related art include Japanese Laid-open Patent Publication No. 2012-98975 and Japanese Laid-open Patent Publication No. 2016-71881.

SUMMARY

According to an aspect of the embodiments, an item presentation method implemented by a computer, the item presentation method includes: executing a selection processing that includes selecting a plurality of candidate items that are presentation candidates from a plurality of items, based on a preference of a user; executing a calculation processing that includes calculating the number of new items newly presented among the plurality of candidate items by referring to an item presentation history to the user; executing a decision processing when the number of new items is a predetermined number or less, the decision processing including deciding, as a recommendation item, an item located away from the preference in an item space about the preference by a distance less than a threshold value; and executing a presentation processing that includes selecting a presentation item presented to the user from the plurality of candidate items and the recommendation item, and presenting the selected presentation item.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates an example of information stored in a real estate information DB;

FIG. 6 illustrates a history of presentation items stored in a historical information DB;

FIG. 7 is an explanatory diagram of an example of a display screen;

DESCRIPTION OF EMBODIMENT(S)

However, according to the above-mentioned techniques, a wide variety of items may not be effectively presented, resulting in that the user may leave the system before reaching the true preference.

For example, sparseness and denseness of items is present in an item space. Thus, when the user's preference reaches an item sparse region in the item space, a user's selectable range is narrowed as compared to an item dense region, impairing proper preference correction. In addition, when the user's preference is consistent to some extent, diverse items may not be presented, resulting in that the user's selection become stereotyped and the user tends to early leave the system.

From one aspect, an object is to provide an item presentation method, an item presentation program, and an item presentation apparatus that may effectively present a wide variety of items.

According to an embodiment, a wide variety of items may be effectively presented.

Hereinafter, embodiments of an item presentation method, an item presentation program, and an item presentation apparatus disclosed in the present application are described in detail with reference to the drawings. It is noted that the embodiments do not limit the present disclosure. The embodiments may be combined with each other as appropriate when there is no contradiction.

Embodiment 1

[Overall Configuration]

Figure 1:
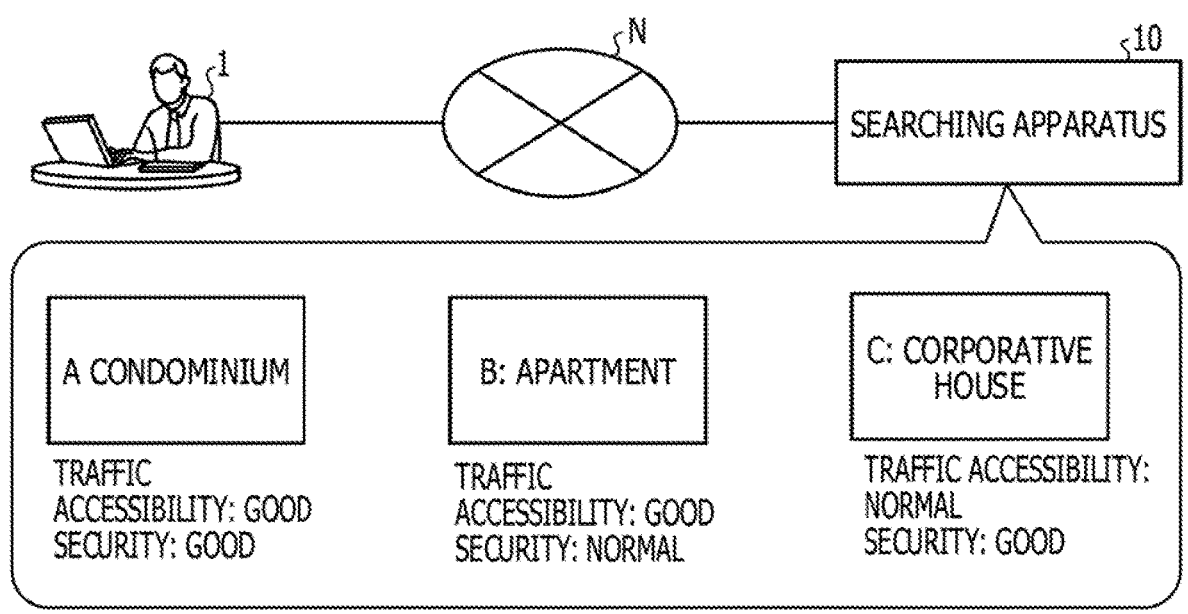
FIG. 1 is a diagram for explaining an example of an overall configuration of a system according to Embodiment 1.

FIG. 1 is a diagram for explaining an example of an overall configuration of a system according to Embodiment 1. As illustrated in FIG. 1, this system is a real estate matching system in which a user terminal 1 is coupled to a searching apparatus 10 via a network N. Various networks such as the Internet, regardless of wired or wireless, may be employed as the network N. In this figure, one user terminal 1 is illustrated. However, the present disclosure is not limited to this, and a plurality of user terminals 1 may be coupled.

In this system, the user terminal 1 used by the user who searches for real estate information accesses the searching apparatus 10 to search real estate information. Then, the searching apparatus 10 causes the user terminal 1 to display a plurality of questions, and estimates a user's preference, which is an item emphasized by the user, liking, or the like. Next, the user searches for real estate information that matches the preference, and presents the real estate information to the user terminal 1. In this manner, this system serves to match the user with real estate information.

It is noted that, in the present embodiment, the real estate matching system is described as an example. However, the present disclosure is not limited to this. For example, the present disclosure is applicable to any system for estimating the user's preference based on user's responses to inquiries, for example, migration matching between intending immigrants and municipality.

The user terminal 1 is a computer used by the user who searches for real estate information, such as personal computer, mobile phone, tablet terminal, smart phone, or the like. The user is an example of an answerer.

The searching apparatus 10 is a server that performs the above-mentioned real estate matching, and is an example of an item presentation apparatus. The searching apparatus 10 stores various logs including information on real estate (such as "A condominium, B apartment, C cooperative house"), user's search history, and information on estimation of the preference demanded by the user. Then, the searching apparatus 10 makes a plurality of inquires (questions) to the user, estimates and the user's preference based on user's answers, and presents real estate information that matches the user's wishes. It is noted that, in the present embodiment, real estate information presented to the user may be described as "item".

In recent years, techniques of rapidly sensing a change in user's preference and dynamically changing presentation items to achieve the presentation of effective items have been utilized. For example, according to a known technique, the convincing process that the user continues to search for items even when reaching a true preference is identified to display whether or not any item that would be attractable to the user is present.

There is another known technique of determining whether or not the user has found his/her liking based on the user's preference log, and if found, displaying how many new items are present in such direction. Also, there is a technique of presenting items that have not been selected by the user while conforming to the user's preference trend, in order to reduce the focusing process that the user examines other items closing to his/her preference and refining it.

However, sparseness and denseness of items are present in an item space. Thus, when the user's preference proceeds toward the sparse side in the item space before the user reaches the true preference, new items hardly appear. As a result, the user's selection become stereotyped and thus, the user tends to leave the system.

Figure 2:
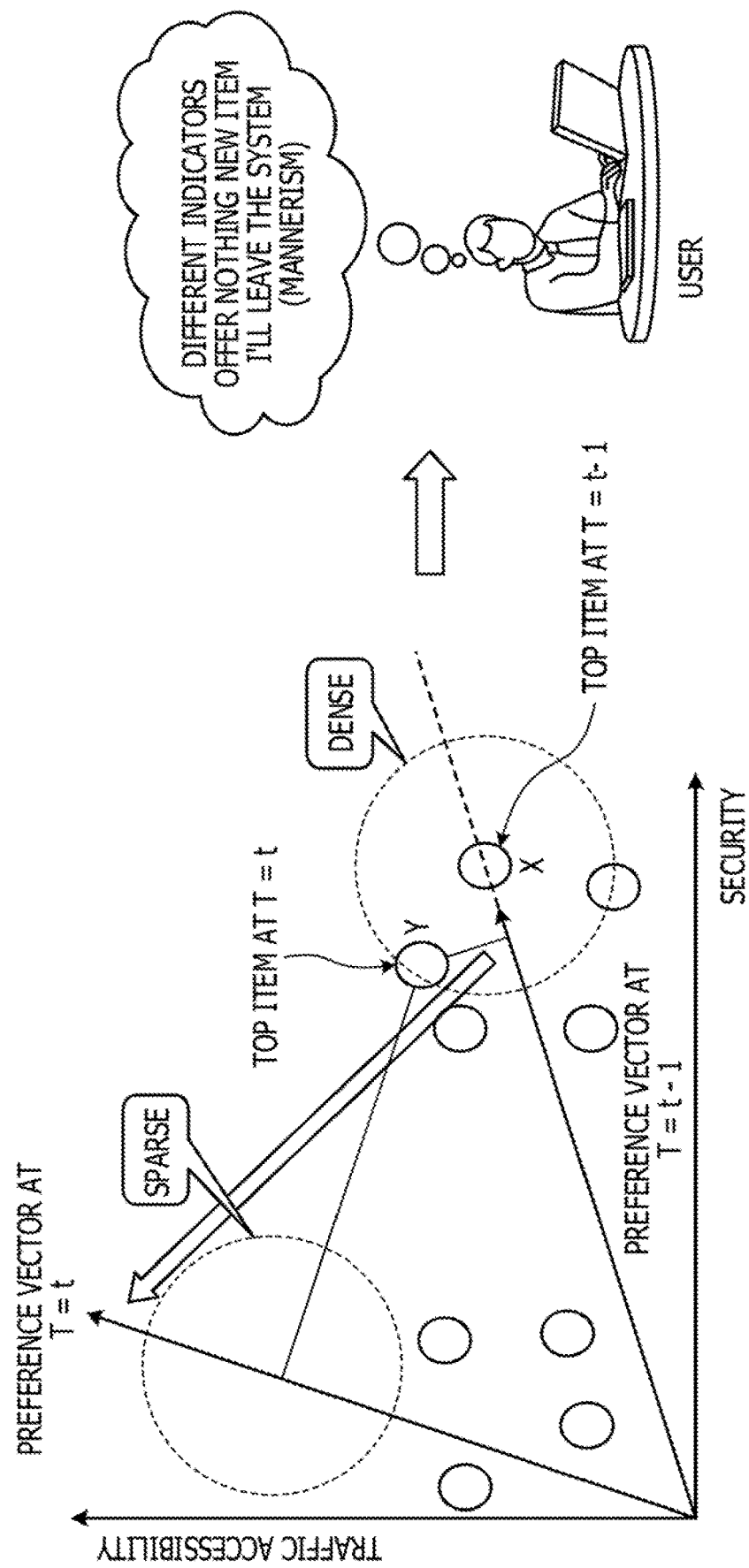
FIG. 2 is an explanatory diagram of sparseness and denseness in an item space.

FIG. 2 is an explanatory diagram of sparseness and denseness in the item space. FIG. 2 illustrates an example of the item space having "traffic accessibility" and "security" as attributes, and items are identified in the item space using a two-dimensional indicator of traffic accessibility and security. As illustrated in FIG. 2, at a time T=t−1, since an item X of the presentation rank 1 is close to a preference vector that is a direction of the user's preference, many items are present around the preference vector. For this reason, it may be determined that the items are dense, and various items other than the item X of the presentation rank 1 may be presented to the user.

At a time T=t at the next preference, since the preference of traffic accessibility increases, the preference vector changes. At this time, because the preference vector is remote from a top item Y, the number of items around the preference vector is small, and the items are sparse. Thus, the items to be presented decreases, narrowing the user's selectable range.

Thus, the searching apparatus 10 according to Embodiment 1 determines sparseness and denseness in the item space, thereby determining the user's state as a mannerism risk mode when the preference vector shifts to the item sparse side. Then, when determining the user's state as the mannerism risk mode, the searching apparatus 10 determines that effective item presentation is difficult as the preference vector proceeds toward the sparse side, and thus, preferentially presents items that are not generally selected as items to be presented, effectively presenting items more diversely.

Figure 3:
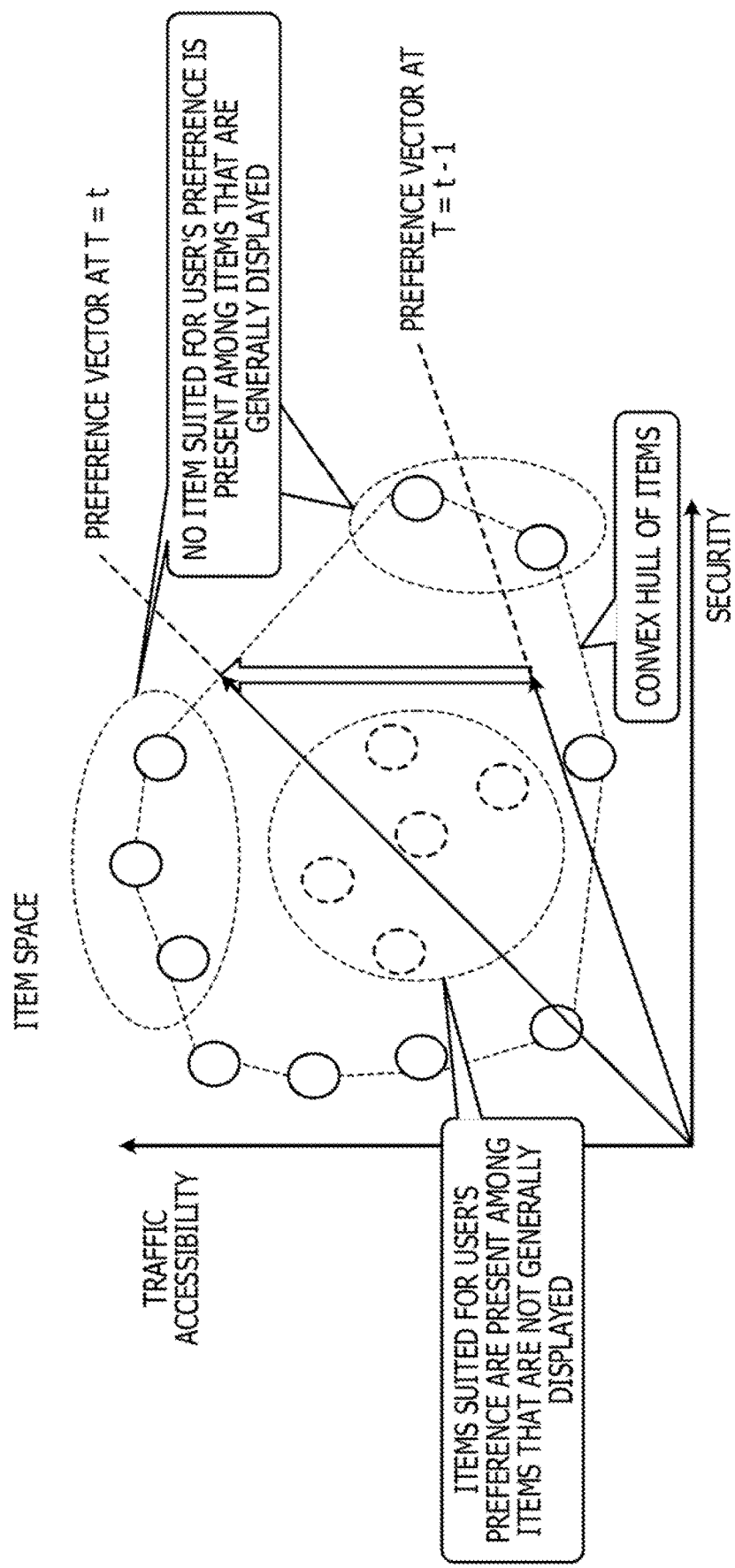
FIG. 3 is an explanatory diagram of item presentation in consideration of sparseness and denseness of items.

FIG. 3 is an explanatory diagram of item presentation in consideration of sparseness and denseness of items. The present embodiment describes an example of the item space having "traffic accessibility" and "security" as attributes, and items are identified in the item space using a two-dimensional indicator of traffic accessibility and security. A preference space corresponding to the user's preference also has "traffic accessibility" and "security" as attributes, and the user's preference is identified in the item space using a two-dimensional indicator of traffic accessibility and security. However, for clarification of explanation, the item space and the preference space may be represented within the same space. The axis of traffic accessibility indicates the degree of importance is higher toward the upper side (away from the original), and the axis of the security indicates the degree of importance is higher toward the right side (away from the original).

Generally, in a recommendation system that items are ranked in any form, items that are not highly ranked but may match a particular user are present. For example, as illustrated in FIG. 3, when the items are ranked using a linear utility function, items located near the center of a convex hull of the items may be less attractable to the user, but matches the user in terms of points that are not measured by the utility function, such as balance between indicators and item appearance.

As Illustrated in FIG. 3, when the preference vector shifts to the item sparse side, no items suited for the user's preference is present among the presented items. To present items suited for the user's preference and estimate an appropriate preference, it may be contemplated to identify an item that is not generally presented, and to extract the identified item as a newly presented item candidate.

In consideration of such situation, in Embodiment 1, in place of endpoints of the convex hull in the item space, items within the convex hull, which are hard to be displayed even when the preference vector changes, are preferentially presented to the user in the mannerism risk mode. That is, the user in the mannerism risk mode in searching for real estate information is rapidly detected, and real estate information that is highly ranked but is applicable is preferentially presented to such user, achieving diversification.

[Functional Configuration]

Figure 4:
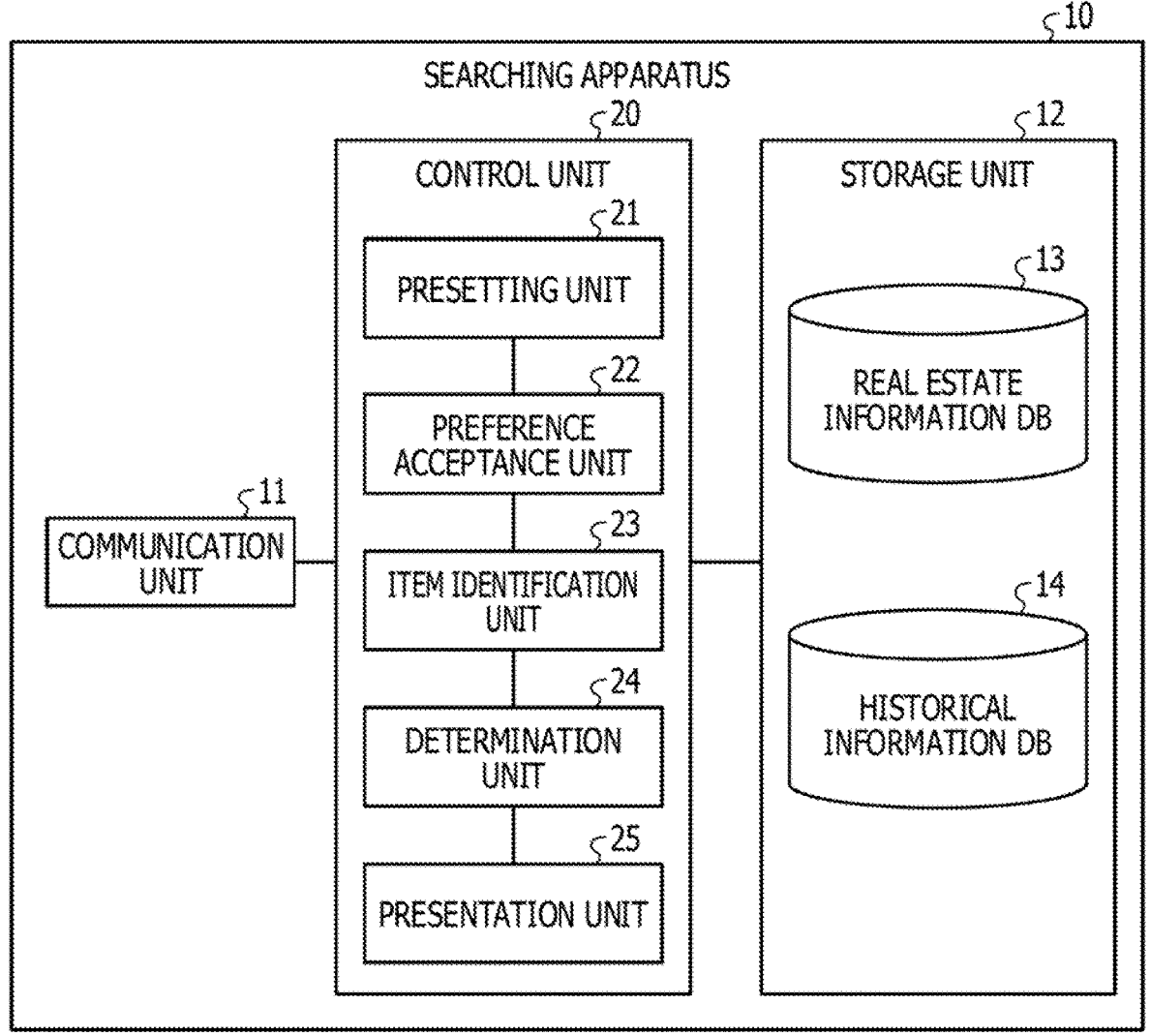
FIG. 4 is a functional block diagram illustrating a functional configuration of the searching apparatus according to Embodiment 1.

FIG. 4 is a functional block diagram illustrating a functional configuration of the searching apparatus 10 according to Embodiment 1. As illustrated in FIG. 4, the searching apparatus 10 includes a communication unit 11, a storage unit 12, and a control unit 20. The communication unit 11 is a processing such as a communication interface, which controls communication with another terminal such as the user terminal 1. For example, the communication unit 11 establishes communication with the user terminal 1 via a Web browser, and exchanges information on the Web browser.

The storage unit 12 is an example of a storage device such as memory and hard disc, which stores data and various programs performed by the control unit 20. The storage unit 12 stores a real estate information database (DB) 13 and a historical information DB 14. It is noted that, the storage unit 12 may also store other various types of information on the user, for example, user's name and the state of preference.

The real estate information DB 13 is a database that stores real estate information presented to the user by the searching apparatus 10. Specifically, the real estate information DB 13 stores information set for each real estate in terms of a plurality of items characterizing the real estate. FIG. 5 illustrates an example of the information stored in the real estate information DB 13. As illustrated in FIG. 5, the real estate information DB 13 stores real estate in association with "real estate name, traffic accessibility, shopping, school, security" and the like.

The "real estate name" stored herein is a name that identifies a certain real estate such as condominium. The "traffic accessibility, shopping, school, security" are appeal points of real estate, and are used as information that identifies the item space. It is noted that the number and contents of the categories listed herein may be changed. The "traffic accessibility" is information on the traffic accessibility, the "shopping" is information on supermarket stores and so on in the district, the "school" is information on schools in the district, and the "security" is information on the number of crimes in the district.

FIG. 5 illustrates that "A condominium" is located within five minutes on foot from the XX station, there is a large supermarket store in the district, it takes X minutes on foot to a near elementary school, and X minor offences occur in a year. It is noted that real estate information DB 13 may hold specific numerical values (scores) for each category.

The historical information DB 14 is a database that stores various logs occurring in real estate matching. Specifically, for each user, the historical information DB 14 stores a history of the number of presented items, inquiries from the searching apparatus 10, responses to the inquiries, a set of attributes input by the user, a selection history (preference history) of the user, and so on.

FIG. 6 illustrates a history of the presentation item stored in the historical information DB 14. As illustrated in FIG. 6, the historical information DB 14 may store the number of new items that are not previously presented, as the historical information on the items presented to the user. In the example illustrated in FIG. 6, "eight" items are presented on the first time, and five newly changed items are presented on the second time. Noted that, for example, when the number of items presented each time is limited to three, the number of new items is three or less. The items presented to the user are recorded in the historical information DB 14 without counting repeated items.

The control unit 20 is a processing unit that manages the entire searching apparatus 10 and is, for example, a processor or the like. The control unit 20 has a presetting unit 21, a preference acceptance unit 22, an item identification unit 23, a determination unit 24, and a presentation unit 25. The presetting unit 21, the preference acceptance unit 22, the item identification unit 23, the determination unit 24, and the presentation unit 25 are examples of electronic circuits included in the processor or examples of processes executed by the processor.

Figure 7:
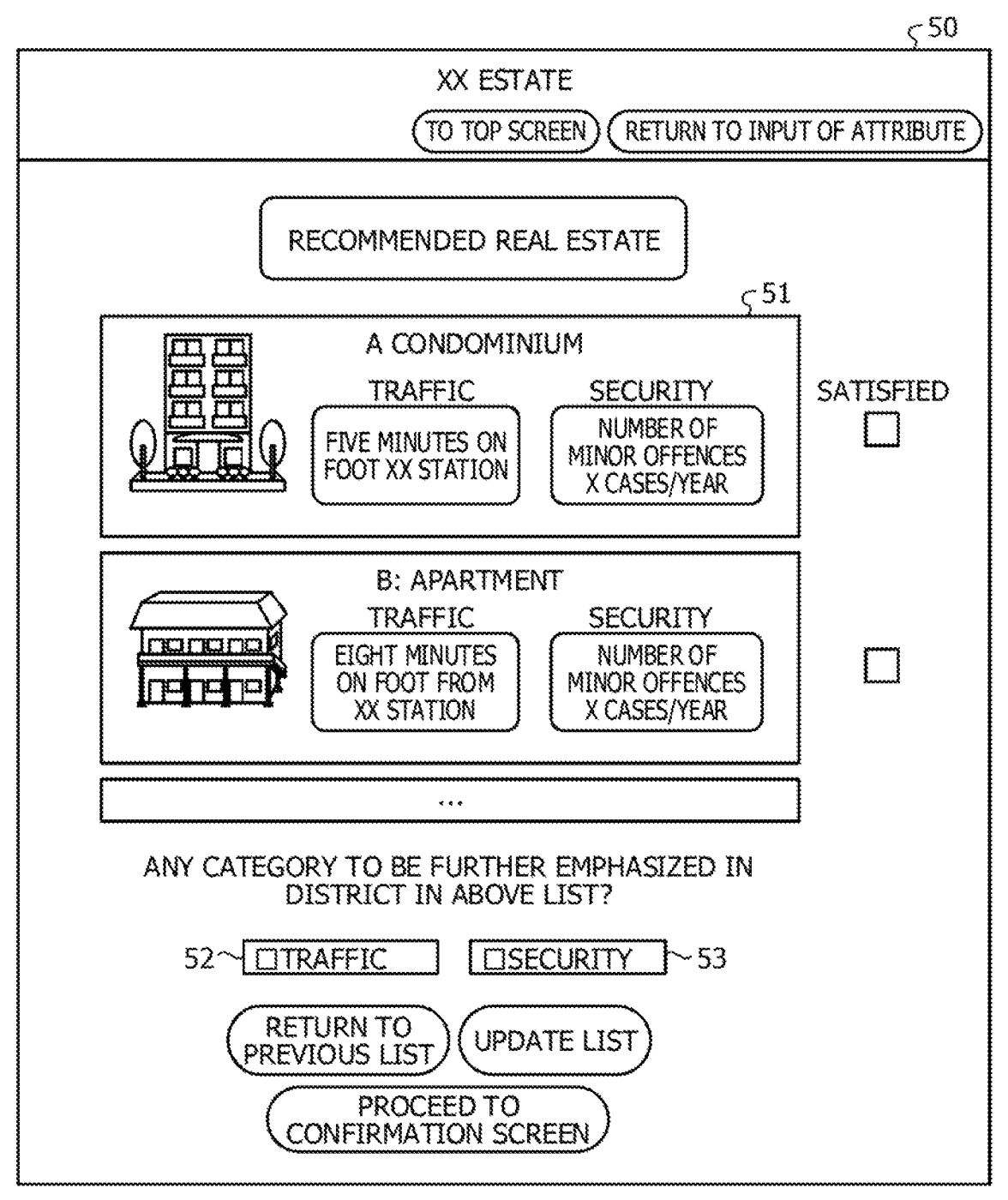

Here, the searching apparatus 10 is a Web screen displayed on the user terminal 1. A screen for presenting items and accepting the user's preference will be described below. FIG. 7 is an explanatory diagram of an example of a display screen. A screen 50 illustrated in FIG. 7 displays a title of the Web screen, attributes selected by the user, and categories emphasized by the user. An area 51 is an area where a list of real estate information that matches the user, that is, a list of top N items are displayed. It is noted that, in the present embodiment, as an example, N=3, that is, the top three items are presented (recommended).

A button 52 and the button 53 are buttons for accepting selection of emphasized categories. To emphasize traffic accessibility, the button 52 is selected, and to emphasize security, the button 53 is selected. In addition to the buttons, a button for proceeding to a confirmation screen when real estate information has been satisfactory searched, a button for requiring updating of the list, a button for temporarily storing information when the user compare and examine destinations of migration are displayed.

The presetting unit 21 is a processing unit that performs presetting prior to estimation of the user's preference and item presentation. Specifically, the presetting unit 21 sets an item that is not usually recommended but is to be preferentially presented as a push item, and registers the push item in the storage unit 12 or the like.

Figure 8:
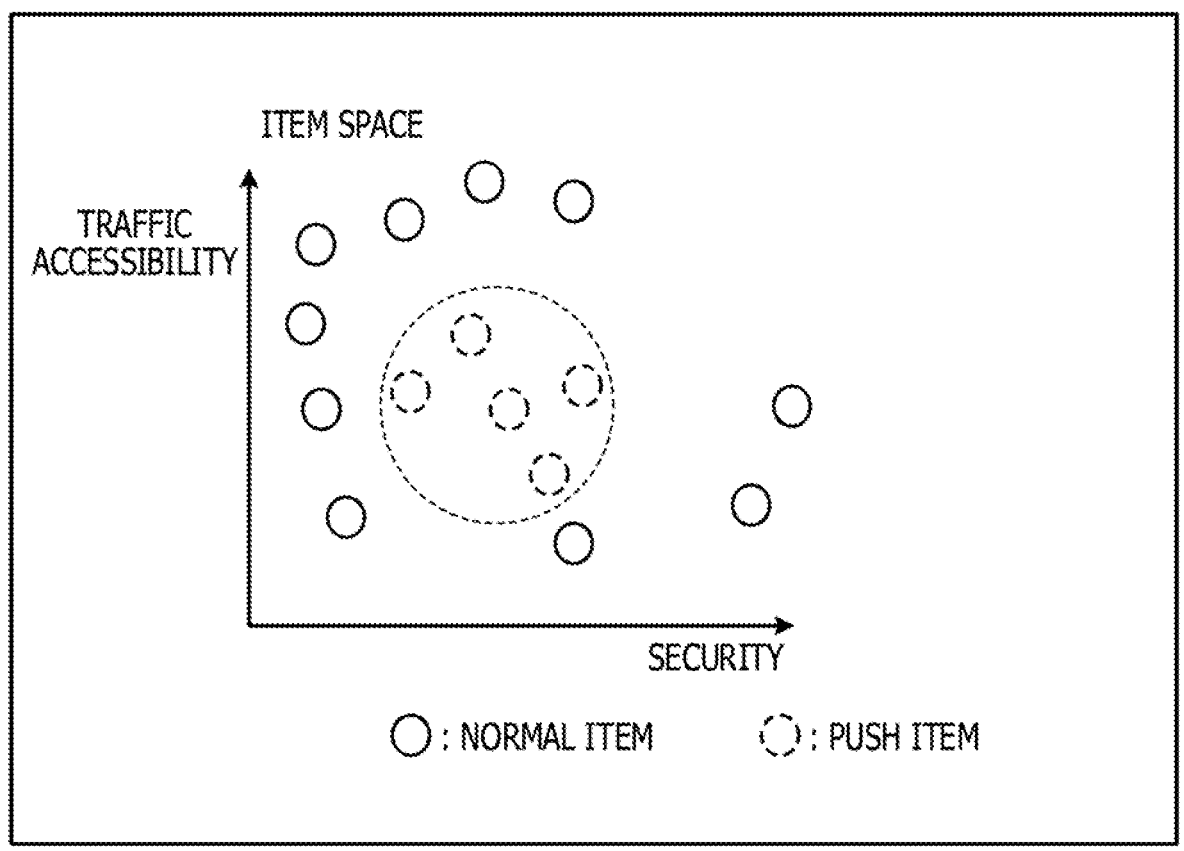
FIG. 8 is an explanatory diagram of presetting.

FIG. 8 is an explanatory diagram of presetting. As illustrated in FIG. 8, the presetting unit 21 maps each item into the item space, based on "traffic accessibility" and "security" of each item stored in the real estate information DB 13. For example, the presetting unit 21 converts "traffic accessibility" and "security" into numbers using predefined indicators, and converts each item in coordinates for mapping. Subsequently, using the position of each item, the presetting unit 21 sets a convex hull in the item space. Here, items that are endpoints of the convex hull in the item space are identified as items that would be a top item.

Then, the presetting unit 21 previously sets items within the convex hull as the push items. For example, the presetting unit 21 calculates a distance between each of the other items within the convex hull and each of the items that are endpoints of the convex hull. Then, the presetting unit 21 may set each item located in a circle having a radius X (X is any number) about a first item having the largest sum of distances from the items that are the endpoints, or each item having a distance less than a predetermined value from the first item, as the push item. The presetting unit 21 may set an item having a distance less than a predetermined value from the item located in the deepest part of the convex hull, as the push item.

That is, the presetting unit 21 identifies the item that may be preferentially recommended to the user since it is located inside of the convex hull in the item space, or is hard to be presented, as the push item. In FIG. 8, the items that are located inside of the convex hull in the item space and thus, are less viewable to the user, as compared to the items that are the endpoints of the convex hull, as the push items.

The preference acceptance unit 22 is a processing unit that accepts the user's preference. Specifically, at the first access, the preference acceptance unit 22 accepts an input of the degree of importance of "traffic accessibility" and "security", thereby accepting the user's preference. The preference acceptance unit 22 also identifies a position preferred by the user in the preference space defined by traffic accessibility (vertical axis) and security (horizontal axis), thereby identifying a vector (preference vector) from the original to the position.

For the second and subsequent accesses, the preference acceptance unit 22 accepts the user's preference on the screen illustrated in FIG. 7. For example, when the "traffic" button 52 is selected on the screen 50 illustrated in FIG. 7 to update the list, the preference acceptance unit 22 moves the preference vector in the direction of traffic accessibility (vertical axis) by a certain distance. Describing in more detail, when the degree of importance of traffic accessibility increases, the preference acceptance unit 22 corrects the preference vector so as to increase an inclination of the preference vector (more inclined).

When the "security" button 53 is selected on the screen 50 illustrated in FIG. 7 to update the list, the preference acceptance unit 22 moves the preference vector in the direction of security (horizontal axis) by a certain distance. Describing in more detail, when the degree of importance of security increases, the preference acceptance unit 22 corrects the preference vector so as to decrease the inclination of the preference vector (less inclined). In this manner, the preference acceptance unit 22 outputs the identified preference vector to the item identification unit 23.

The item identification unit 23 is a processing unit that estimates the user's preference based on the information accepted by the preference acceptance unit 22, and identifies presented items. Specifically, the item identification unit 23 positions the preference vector identified by the preference acceptance unit 22 in the item space defined by traffic accessibility (vertical axis) and security (horizontal axis). Then, the item identification unit 23 decides the ranking of the presented items on the straight line extending in parallel of the preference vector, when the items are orthographically projected.

Figure 9:
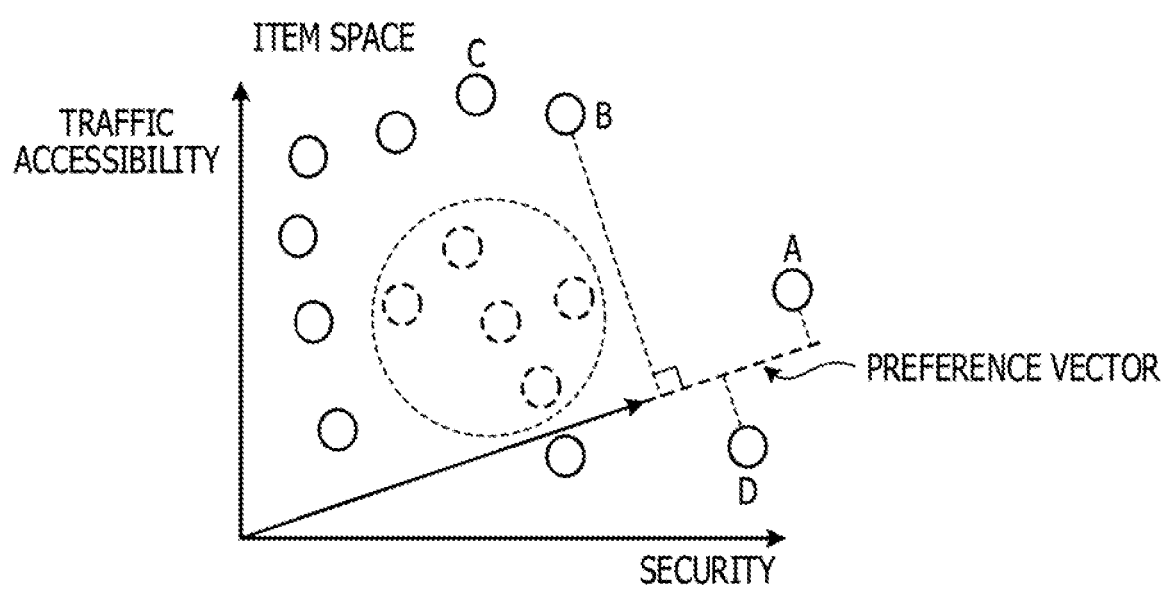
FIG. 9 is an explanatory diagram of item selection.

FIG. 9 is an explanatory diagram of item selection. As illustrated in FIG. 9, the item identification unit 23 projects the preference vector identified in the selected space by the preference acceptance unit 22, into the item space. Subsequently, the item identification unit 23 extends the preference vector positioned in the item space, draws a perpendicular line from each item to the extended preference vector, and presents N items on the Web screen in the order of appearance when the perpendicular lines are counted from the opposite side to the origin, as a top N list, to the user.

Given that N is 3, in the example illustrated in FIG. 9, top three items of an item A, an item D, and an item B are displayed as a top 3 list on the area 51 of the screen 50 in FIG. 7.

Figure 10:
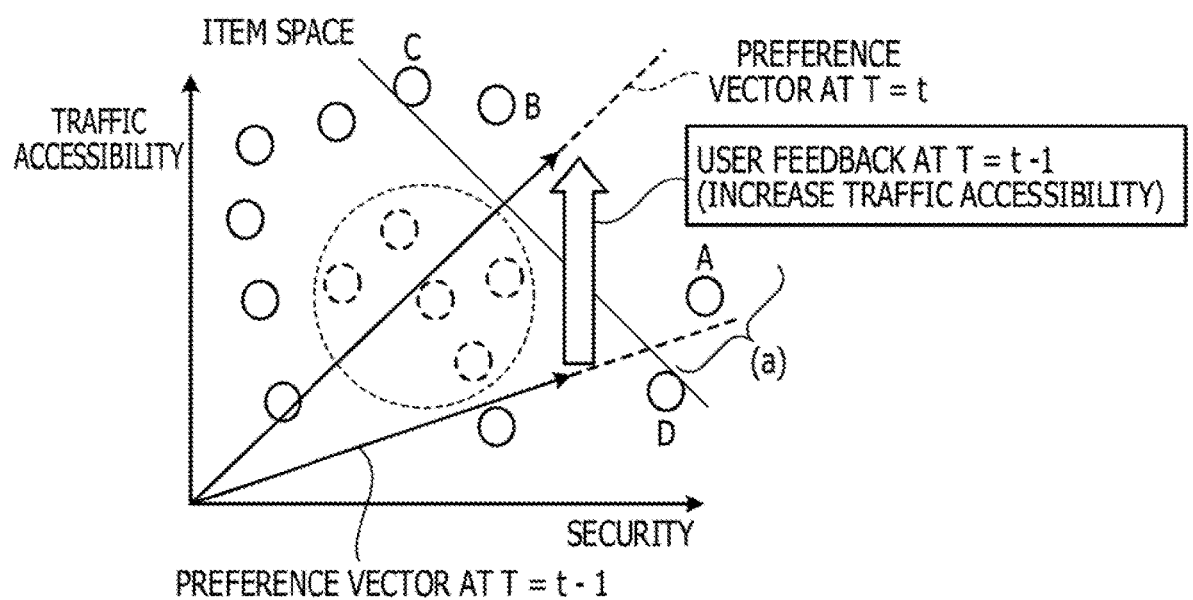
FIG. 10 is an explanatory diagram of the user's preference and item updating.

Subsequently, updating of the presentation item with updating of the user's preference will be described. FIG. 10 is an explanatory diagram of the user's preference and item updating. As illustrated in FIG. 10, based on feedback from the user, the item identification unit 23 positions the user's preference vector in the preference space, and identifies presented items in the item space.

For example, in the preference acceptance unit 22, when the user selects to place importance on traffic accessibility at the time T=t subsequent to the time T=t−1, the user's preference vector is updated. At this time, as illustrated in FIG. 9, the item identification unit 23 projects the preference vector updated in the selected space into the item space, and positions the preference vector in the item space.

Then, the item identification unit 23 extends the preference vector, draws a perpendicular line from each item to the extended preference vector, and selects N items in the order of appearance when the perpendicular lines are counted from the opposite side to the origin, as a top N list. In the example illustrated in FIG. 10, the item identification unit 23 identifies an item A, an item B, and an item C in an area (a) as items to be presented (recommended). After that, the item identification unit 23 informs that the items to be presented are identified to the determination unit 24.

The determination unit 24 is a processing unit that determines sparseness and denseness of items to be presented in the vicinity of the preference vector. Specifically, when receiving information on the items to be selected from the item identification unit 23, the determination unit 24 determines whether or not the user's preference proceeds to the item sparse side, and outputs its result to the presentation unit 25.

For example, the determination unit 24 may determine sparseness and denseness of items in 2-stages of determination based on the distance between the top item and the preference vector, and determination based on the number of newly presented items. It is noted that sparseness and denseness may be determined in one stage using either type of determination.

First, to determine sparseness and denseness of items, the determination unit 24 measures the distance between the top item and the preference vector. That is, when the top item is sufficiently close to the preference vector, at the next user's preference, it is highly likely that the top item is replaced with another item, and items other than previous items are presented. Therefore, it may be determined that the items are dense. On the contrary, when the top item is away from the preference vector, at the next user's preference, it is highly likely that the top item remains, and the same items as previous items are presented. Therefore, it may be determined that the items are sparse.

Figure 11:
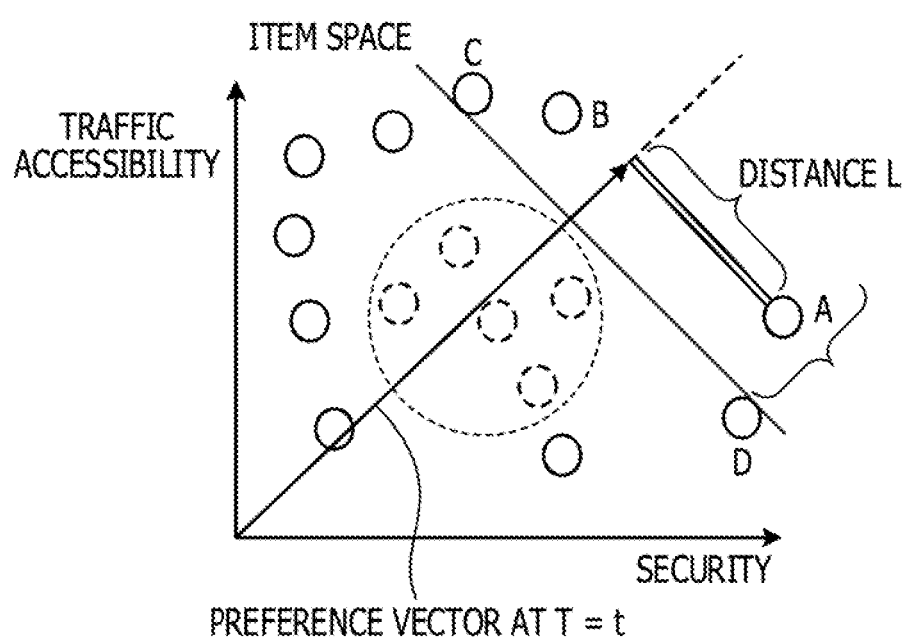
FIG. 11 is an explanatory diagram of determination of sparseness and denseness of items.

FIG. 11 is an explanatory diagram of determination of sparseness and denseness of items. As illustrated in FIG. 11, the determination unit 24 draws a perpendicular line from an item A that is a top item to the preference vector, and measures a length of the perpendicular line as a distance L. Then, when the measured distance L is less than a threshold value, the item is sufficiently close to the preference vector and therefore, the determination unit 24 determines that items in the vicinity of the preference vector are not sparse.

On the contrary, when the measured distance L is more than the threshold value, the item is away from the preference vector and therefore, the determination unit 24 determines that items in the vicinity of the preference vector are sparse and makes next determination.

Figure 12:
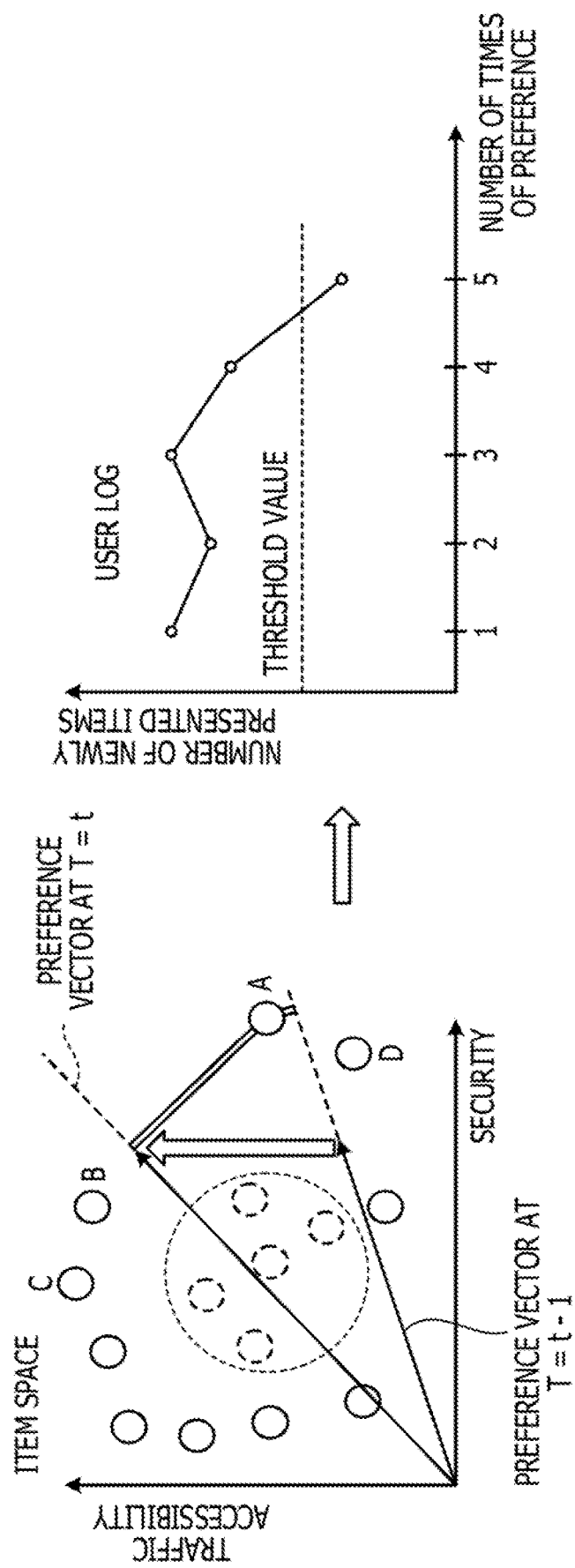
FIG. 12 is an explanatory diagram of determination of sparseness and denseness of items.

Specifically, the determination unit 24 determines whether the number of items newly presented at the time T=t is less than a threshold value, or is the threshold value or more. FIG. 12 is an explanatory diagram of determination of sparseness and denseness of items. As illustrated in FIG. 12, referring to the historical information DB 14, the determination unit 24 counts the number of items changed from the previous presentation items. In FIG. 12, at this time (fifth time), the number of presented items changed from the items presented at the fourth time is less than a threshold value (for example, 2). In this case, the determination unit 24 determines that items in the vicinity of the preference vector are sparse.

In this manner, the determination unit 24 makes 2-stage determination, and outputs a determination result of sparseness and denseness about the items in the vicinity of the preference vector at present to the presentation unit 25.

The presentation unit 25 is a processing unit that presents the items according to the determination result of the determination unit 24, to recommend a wide variety of items. Specifically, when it is determined that items in the vicinity of the preference vector are not sparse, the presentation unit 25 presents the top N list identified by the item identification unit 23. In the above-mentioned example, the presentation unit 25 displays top three items of an item A, an item B, and an item C in the area 51 of the screen 50 in FIG. 7.

On the contrary, when it is determined that items in the vicinity of the preference vector are sparse, the presentation unit 25 selects the item recommended to the user (recommendation item) from the push items set by the presetting unit 21 in advance, and presents the selected item.

Figure 13:
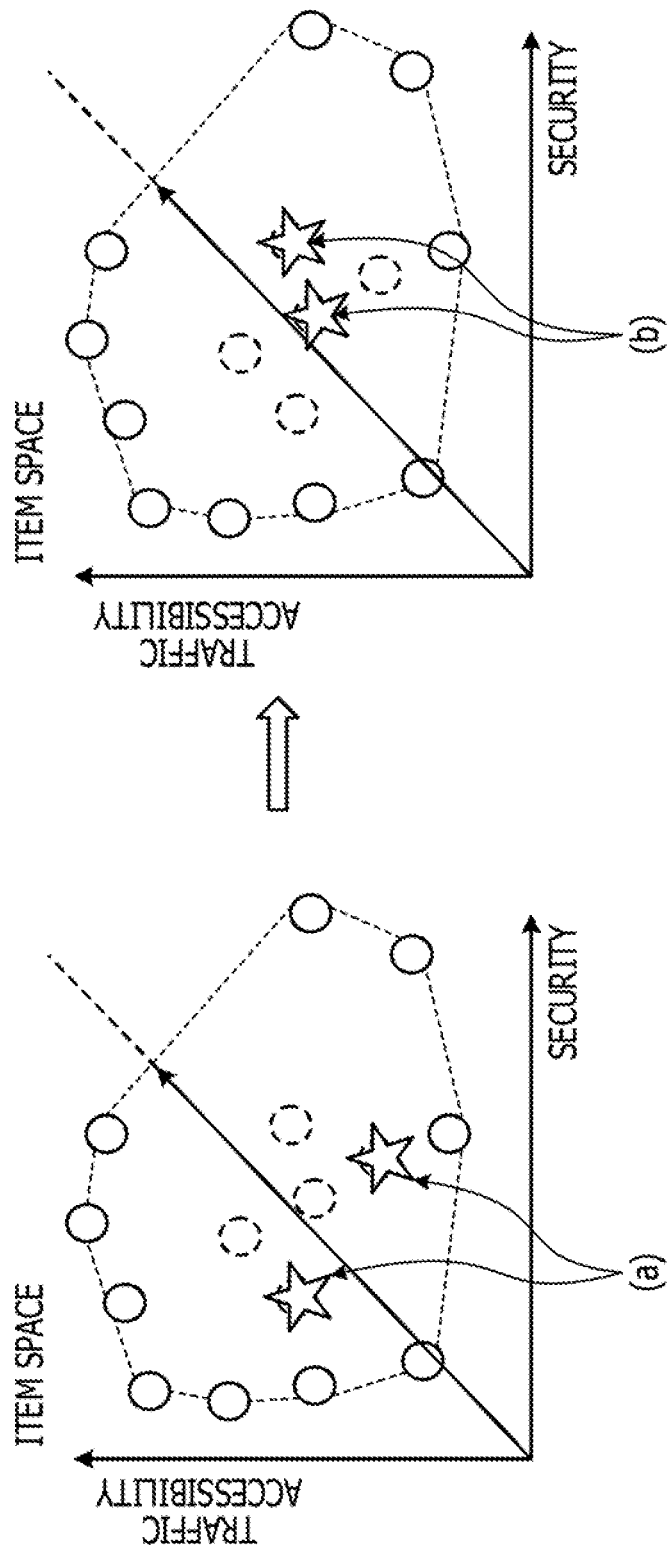
FIG. 13 is an explanatory diagram of a problem of random presentation.

Here, it may be contemplated that the presentation unit 25 randomly selects the recommendation item from the push items. However, such random selection may lower the convenience of the user. FIG. 13 is an explanatory diagram of a problem of random presentation. As illustrated in FIG. 13, when the push items are randomly selected without considering the user's preference vector, items ((a) in FIG. 13) that are away from the preference vector may be selected. Since such items are away from the user's preference vector, they are unlikely to conform to the user's preference.

That is, the user who receives such items may feel that the recommendation system does not understand the user's preference, which is unsuitable. In addition, since the results of past preference actions are not associated with the presentation item, the item does not reflect the user's preference, and the validity of updating of preference is impaired.

Accordingly, it is required to remove items that are unsuitable for items to be recommended from the push items. To this end, in selecting presentation candidates, the distance from the preference vector is considered. Specifically, as illustrated in FIG. 13, items ((b) in FIG. 13) that are close to the preference vector are preferentially selected from the push items, and are presented.

Thus, for each of the item belonging to the push items, the presentation unit 25 calculates a push score ("PushScore") based on a distance between the preference vector and the item, selects the final push item recommended to the user based on the push scores, and presents the selected push item.

Here, the presentation unit 25 calculates the push score of each of the push items according to an equation (1). "a" and "b" expressed in equation (1) are constants, and may be set to any value. "Distance" is a distance between the preference vector and the push item in the item space. An original score ("OriginalScore") is acquired by normal processing, that is, the same method as that of the item identification unit 23, and is a distance between the origin and an intersection of the preference vector and the perpendicular line drawn from the push item to the preference vector. That is, the "Push-Score" is a line segment having an absolute value "a/b" of an inclination with respect to the preference vector, and the order of intercepts with the preference vector becomes the order of the items.

$$\text{PushScore} = -a \times \text{distance} + b \times \text{OriginalScore} \quad \text{equation (1)}$$

Figure 14:
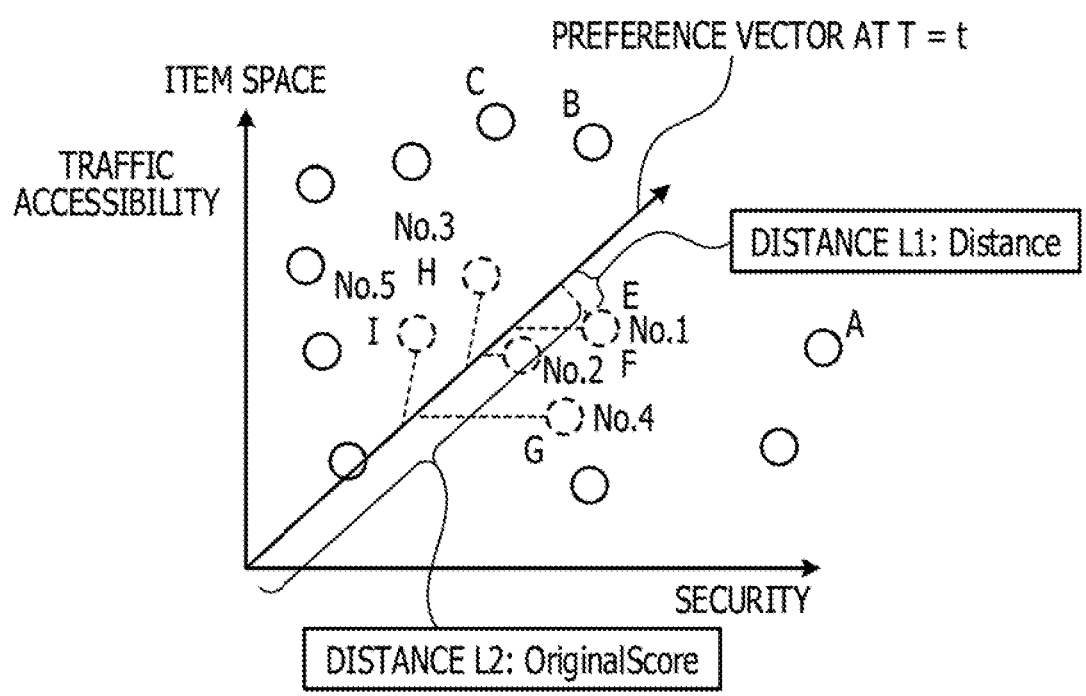
FIG. 14 is an explanatory diagram of calculation of push score.

FIG. 14 is an explanatory diagram of calculation of the push score. As illustrated in FIG. 14, the presentation unit 25 calculates the push score for each of an item E, an item F, an item G, an item H, and an item I, which belong to the push items. For example, using the item E as an example, the presentation unit 25 draws a perpendicular line from the item E to the preference vector at a time T=t, and sets a point at which the perpendicular line and the preference vector intersect as P.

Then, the presentation unit 25 substitutes a distance (length) L1 from the item E to the intersection P, "Distance" and a distance (length) L2 from the origin to the intersection P on the preference vector, "OriginalScore" into the equation (1) to calculate the push score of the item E. Here, it is assumed that the push scores for the item E, the item F, the item H, the item G, and the item I become higher in this order.

In this case, the presentation unit 25 selects the item E having the highest push score from the push items, as the recommended push item. Then, the presentation unit 25 presents the top N items identified by the item identification unit 23 and the push item E to the user.

Figure 15:
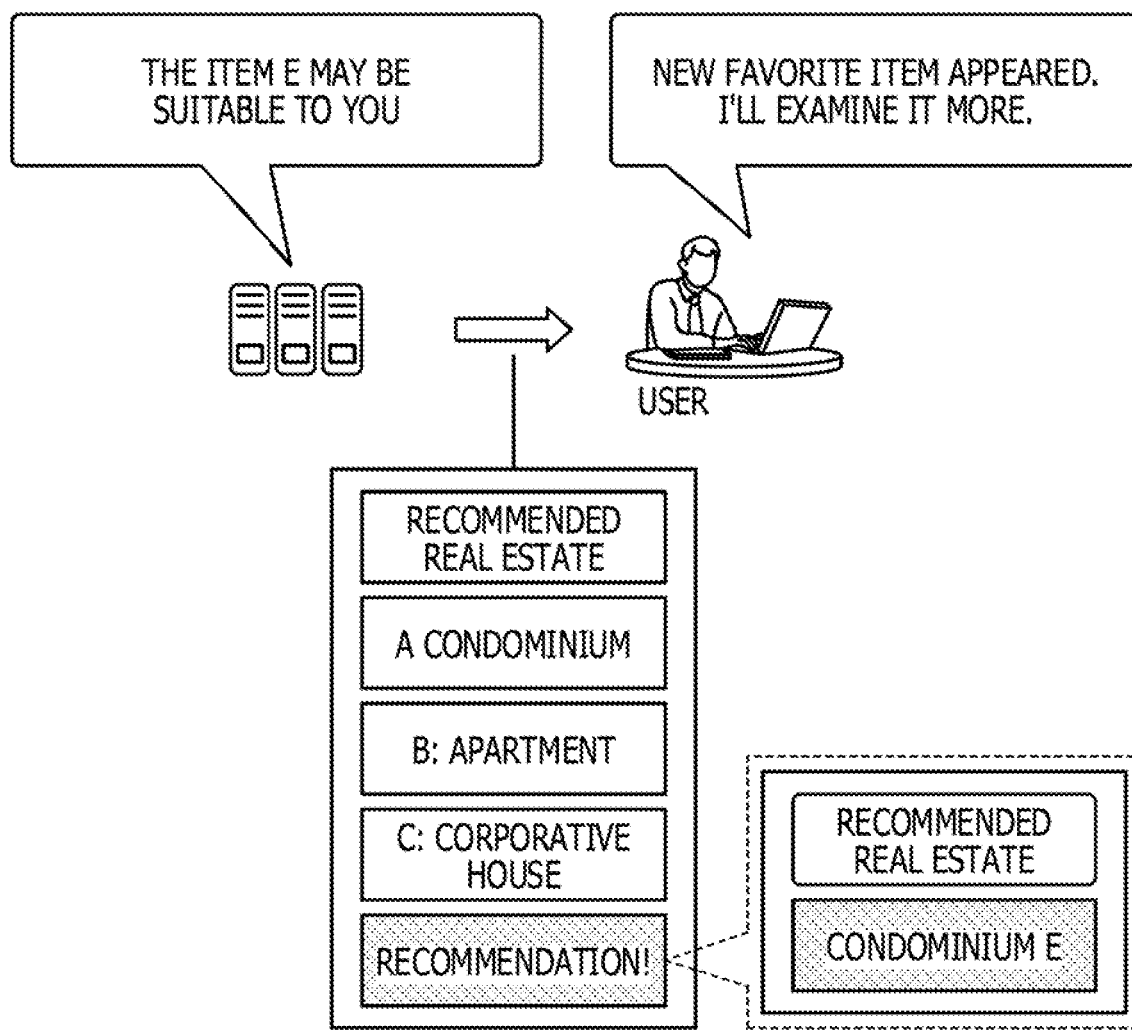
FIG. 15 is an explanatory diagram of an example of presentation of a push item.

FIG. 15 is an explanatory diagram of an example of presentation of the push item. As illustrated in FIG. 15, the presentation unit 25 may present the top N items in the area 51 of the screen 50 illustrated in FIG. 7, and also present a message "The item E may be suitable to you" on the screen 50. In addition, as illustrated in FIG. 15, the presentation unit 25 may display a selectable "Recommendation!" button in the area 51 of the screen 50 illustrated in FIG. 7, in addition to the top N items. Then, when the user selects the "Recommendation!" button, the presentation unit 25 displays real estate information corresponding to the item E.

[Processing Flow]

Figure 16:
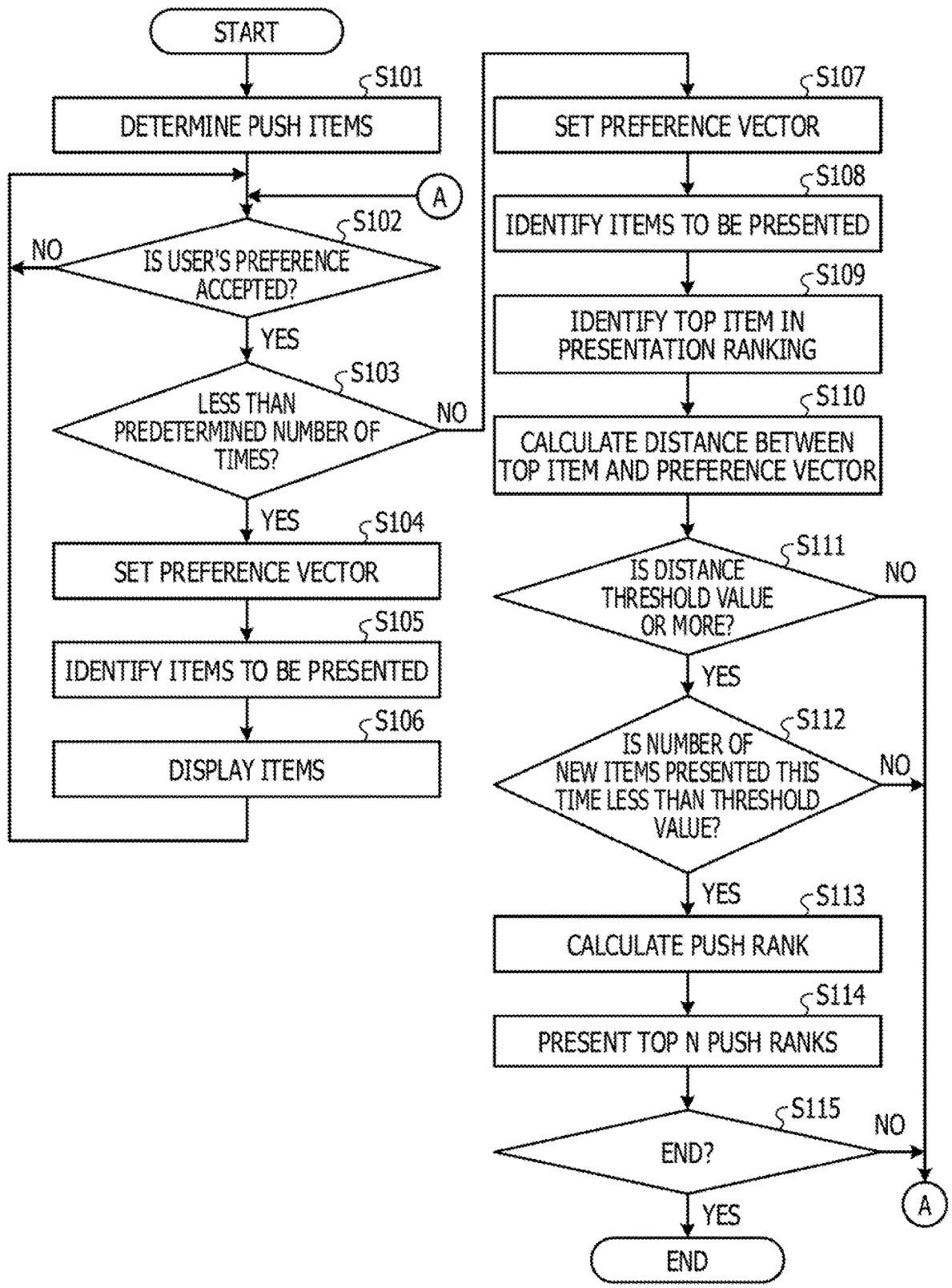
FIG. 16 is a flowchart illustrating a flow of a process.

FIG. 16 is a flowchart illustrating a flow of a process. As illustrated In FIG. 16, when the searching apparatus 10 is activated or start of processing is instructed, the presetting unit 21 of the searching apparatus 10 generates a convex hull in the item space, and determines the push items (S101).

Subsequently, when accepting the user's preference (S102: Yes), the preference acceptance unit 22 determines whether or not the number of times of the user's preference is less than a predetermined number of times (S103). Then, when the number of times of the user's preference is less than the predetermined number of times (S103: Yes), the item identification unit 23 sets the preference vector indicating the user's preference vector identified in the preference space, in the item space (S104), and identifies items to be presented (S105). Then, the presentation unit 25 presents the identified items to be presented to the user (S106).

On the contrary, when the number of times of the accepted user's preference is the predetermined number of times or more (S103: No), the item identification unit 23 sets the preference vector indicating the user's preference vector identified in the preference space, in the item space (S107), and identifies items to be presented (S108).

Subsequently, the determination unit 24 identifies the top item in presentation ranking (S109), and calculates the distance between the top item and the preference vector (S110). Then, when the distance is a threshold value or more (S111: Yes), the determination unit 24 determines that the items in the vicinity of the preference vector are highly likely to be sparse, and determines whether or not the number of new items presented this time is less than a threshold value (S112).

Then, when the number of new items is less than the threshold value (S112: Yes), the determination unit 24 determines that the items in the vicinity of the preference vector are sparse, and calculates push rank for each of the push items (S113).

Subsequently, the determination unit 24 presents the top N items identified in S108 as well as top N items in terms of push rank to the user, and recommends the push items (S114). After that, when the user accepts an instruction to finish real estate search, such as addition of real estate information to Favorites, confirmation of real estate information, and leaving from the system (S115: Yes), the searching apparatus 10 finishes its processing.

On the contrary, when the user does not accept the instruction to finish real estate search and continues search (S115: No), the steps in S102 and subsequent steps are repeated.

In S11, when the distance between the top item and the preference vector is the threshold value (S111: No), or in S112, the number of new items is the threshold value or more (S112: No), it is determined that items in the vicinity of the preference vector are dense, and the steps in S102 and subsequent steps are repeated without selecting the push item.

Effects

As described above, the searching apparatus 10 determines whether or not the user's state is in the mannerism risk mode by taking a log of the number of items newly presented to the user, and the distance between the top item and the preference vector. Then, when the user's state is in the mannerism risk mode, the searching apparatus 10 prepares scores in consideration of the distance between the item in addition to scores used in normal recommendation, thereby presenting the item that is likely to match the user among items that are hard to be presented.

As a result, the searching apparatus 10 may determine the mannerism risk mode of the user and not select the mode, thereby suppressing the user from leaving the user and enabling the user to express his/her preference more properly. In addition, the searching apparatus 10 may present items within the convex hull in the item space to present more diverse items to the user.

Embodiment 2

While an embodiment of the present disclosure has been described, the present disclosure may be implemented in various different forms other than the embodiment described above.

[Number of New Items]

In the above-mentioned embodiment, the last presentation items are compared with items that become presentation candidates this time, and the number of items that are not included in the last presentation items and are included in the current presentation candidates is held as the number of new items. However, the present disclosure is not limited to this. For example, the number of presentations of each item is counted, and among the items that become presentation candidates this time, the number of items having the number of presentations of 1 this time may be held as the number of new items.

[Determination Timing]

In the above-mentioned embodiment, sparseness and denseness of items is determined after the user's preference has been executed a predetermined number of times. However, the present disclosure is not limited to this, and may be set in any suitable manner. For example, sparseness and denseness of items may be also determined at the first user's preference. Further, both of the items identified by the item identification unit 23 and the push item are presented in the above description. However, the present disclosure is not limited to this. For example, only the push item may be presented, and the push item may be presented in place of the third item among top three items.

[Numerical Value and Display]

Various numerical values, threshold values, and screens in the above-mentioned embodiment are merely examples, and may be changed in any suitable manner. In the above-mentioned embodiment, mapping of traffic accessibility and security into the two-dimensional space. However, the present disclosure is not limited to this, and the categories illustrated in FIG. 5 may be combined with each other. For example, in the case of four categories, one of the four categories is inquired as the emphasizing category, and is mapped into a four-dimensional space and then, the above-mentioned processing is executed.

[Item]

In the above-mentioned embodiment, items are selected in the two-dimensional virtual space. However, the present disclosure is not limited to this, and for example, any well-known linear calculation method may be employed. Further, although the top 3 list is displayed in Embodiment 1, any other list such as a top 4 list may be set.

[Push Item]

In the above-mentioned embodiment, the push items located within the convex hull and away from the preference vector by the distance less than the threshold value are selected. However, the present disclosure is not limited to this, and the push item may be selected based whether or not it is separated from the preference vector by the distance less than the threshold value.

[Example of Preference]

In the above-mentioned embodiment, as an example of expression of the user's preference, emphasizing attributes (preference) may be expressed using "+(plus)" and "−(minus)". As long as the category of each real estate information is set in numerical value, when the user selects "+" in traffic, a predetermined value such as 1 may be added.

Specifically, in the state where "traffic accessibility=2, security=1" is selected as the user's preference, when "security+" is selected, the user's preference changes to "traffic accessibility=2, security=2". In the state where "security=10 cases/year (crime)" is selected as the current preference, when the user designates "security+", the preference corresponds to real estate with "9 cases/year (crime)" being set.

[System]

Processing procedures, control procedures, specific names, and information containing various kinds of data and parameters indicated in the specification and the drawings may be changed in any manner unless otherwise specified.

The constituent elements of the devices illustrated in the drawings are functional conceptual ones and not necessarily configured physically as illustrated in the drawings. Specific forms of distribution and integration of the devices are not limited to those illustrated in the drawings. All or some of the devices may be functionally or physically distributed or integrated in any unit based on various loads, usage statuses, or the like. For example, the preference acceptance unit 22 and the item identification unit 23 may be unified.

All or some of the processing functions performed by the devices may be implemented by a central processing unit (CPU) and a program analyzed and run by the CPU or may be implemented by a hardware device using wired logic coupling.

[Hardware]

Figure 17:
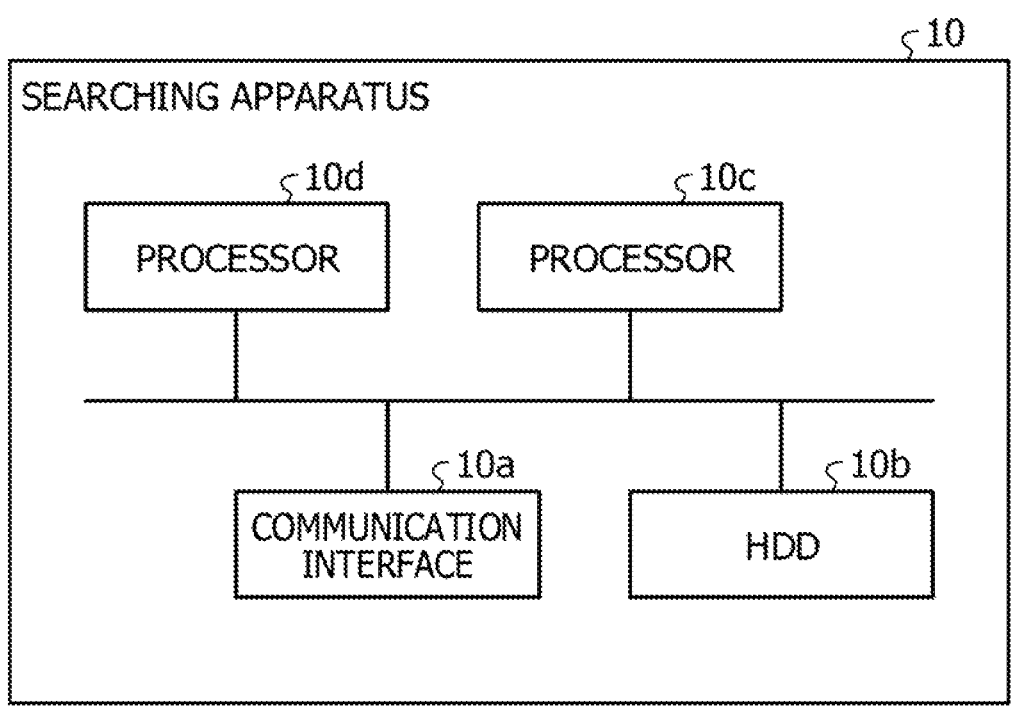
FIG. 17 is a diagram describing an example of a hardware configuration.

FIG. 17 is a diagram describing an example of a hardware configuration. As illustrated in FIG. 17, the searching apparatus 10 includes a communication device 10a, a hard disk drive (HDD) 10b, a memory 10c, and a processor 10d. The devices illustrated in FIG. 17 are coupled to each other via a bus or the like.

The communication device 10a is, for example, a network interface card and communicates with a server. The HDD 10b stores a program for causing the functional units illustrated in FIG. 3 to operate and stores the DBs illustrated in FIG. 3.

The processor 10d executes processes that implement the functions illustrated in, for example, FIG. 4 by reading from the HDD 10b or the like the program that implements processing operations identical to those of the processing units illustrated in FIG. 4 and loading the program into the memory 10c. In other words, for example, the processes implement the same functions as that of the processing units included in the searching apparatus 10. For example, the processor 10d reads, from the HDD 10b or the like, a program having functions that are substantially the same as those of the presetting unit 21, the preference acceptance unit 22, the item identification unit 23, the determination unit 24, and the presentation unit 25, and so on. The processor 10d runs a process of performing processing that is substantially the same as the processing of the presetting unit 21, the preference acceptance unit 22, the item identification unit 23, the determination unit 24, and the presentation unit 25, and so on. The item identification unit 23 is an example of a selection unit, the determination unit 24 is an example of a calculation unit, and the presentation unit 25 is an example of a decision unit and a presentation unit.

As described above, the searching apparatus 10 functions as an information processing apparatus that implements a searching method by reading and running the program. The searching apparatus 10 may also implement the same functions as those of the embodiments described above by reading the program from a recording medium with the use of a medium reading device and running the read program. The program described in other embodiments is not limited to a program that is run by the searching apparatus 10. For example, the disclosure is applicable to the case in which another computer or a server runs the program or the case in which the other computer and the server cooperate to run the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An item presentation method implemented by a computer, the item presentation method comprising:

executing a selection processing that includes
arranging, in a N-dimensional space (N is a number of attributes), each of a plurality of items stored in a memory by using a parameter of each of the attributes associated with the each of the plurality of items, the N-dimensional space being defined by a respective axis corresponding to each of the attributes, the N-dimensional space having an origin being a point where the respective axis corresponding to each of the attributes intersects each other, a value of the respective axis being proportional to a distance from the origin and representing an intensity of a corresponding attribute, each of the plurality of items having a respective value of each of the attributes, generating a preference vector in the N-dimensional space by using a preference of a user, the preference of the user having a respective value of each of the attributes, the preference vector being a vector arranged in a direction from the origin toward a point defined by the respective value of each of the attributes included in the preference of the user, generating, for each of the plurality of items, a first perpendicular line from the each of the plurality of items to the preference vector, and selecting a plurality of candidate items from among the plurality of items, the selected plurality of candidate items being a predetermined number of top items determined in order of appearance of the first perpendicular line on the preference vector from an opposite side to the origin in the N-dimensional space;

executing a calculation processing that includes calculating a first distance of the first perpendicular line drawn from a first candidate item to the preference vector, the first candidate item being one of the selected plurality of candidate items;

executing a decision processing in response that the calculated first distance is larger than a threshold, the decision processing including selecting a convex hull from among the plurality of items, the convex hull including one or more items of the plurality of items other than the first candidate item, generating, for each of the one or more items included in the convex hull, a second perpendicular line from the each of the one or more items included in the convex hull to the preference vector, calculating, for each of the one or more items included in the convex hull, a second distance of the second perpendicular line drawn from the each of the one or more items included in the convex hull to the preference vector, the calculated second distance being a value inversely proportional to a degree to which the each of the one or more items matches with the preference of the user, calculating, for each of the one or more items included in the convex hull, a third distance from the origin in the N-dimensional space to a first contact point associated with the each of the one or more items included in the convex hull, the first contact point being a point where the preference vector is contacted with the second perpendicular line from the each of the one or more items included in the convex hull, the calculated third distance being a value proportional to a degree to which the each of the one or more items matches with the preference of the user, calculating, for each of the one or more items included in the convex hull, an index value by subtracting the second distance from the third distance, and deciding a recommendation item from among the one or more items, the decided recommendation item being an item having a highest index value from among index values obtained by the calculating of the index value for the one or more items; and executing a presentation processing that includes
    in response that the one or more items included in the convex hull is two or more items, obtaining, from among the one or more items included in the convex hull, one or more presentation items to be presented to the user, the one or more presentation items including one or more items each of which is arranged within a circle-shaped area in the N-dimensional space, the circle-shaped area being an area corresponding to a circle defined by a radius of a predetermined value and by a center point corresponding to the decided recommendation item, and
    in response to the obtaining of the one or more presentation items, displaying on a screen of a display device, the decided recommendation item or a data set including the decided recommendation item and the obtained one or more presentation items.

2. The item presentation method according to claim 1, wherein
the decision processing includes deciding, as the recommendation item, an item located within a convex hull generated from the plurality of items and away from the preference by a distance less than a threshold value in the N-dimensional space.

3. The item presentation method according to claim 2, wherein
the selection processing includes
generating a preference vector indicating the preference of the user in the N-dimensional space identified by a plurality of categories characterizing the plurality of items,
drawing a perpendicular line from each of the plurality of items to the preference vector, and
selecting, as the plurality of candidate items, a predetermined number of top items determined in order of appearance of the perpendicular lines on the preference vector from an opposite side to an origin of the N-dimensional space.

4. The item presentation method according to claim 3, the method further comprising:
ranking the plurality of candidate items in the order of appearance of the perpendicular lines; and
measuring a distance between each of the predetermined number of top items among the plurality of candidate items and the preference vector, wherein
the calculation processing includes counting a number of new items when the measured distance is a threshold value or more.

5. The item presentation method according to claim 4, wherein
the decision processing includes ranking the plurality of candidate items, based on a length of the perpendicular line drawn from each of the plurality of candidate items to the preference vector, and
the presentation processing includes selecting the predetermined number of top items among the plurality of candidate items as the presentation items, and presenting the presentation items to the user.

6. A non-transitory computer-readable storage medium for storing an item presentation program which causes a processor to perform processing, the processing comprising:
executing a selection processing that includes
    arranging, in a N-dimensional space (N is a number of attributes), each of a plurality of items stored in a memory by using a parameter of each of the attributes associated with the each of the plurality of items, the N-dimensional space being defined by a respective axis corresponding to each of the attributes, the N-dimensional space having an origin being a point where the respective axis corresponding to each of the attributes intersects each other, a value of the respective axis being proportional to a distance from the origin and presenting an intensity of a corresponding attribute, each of the plurality of items having a respective value of each of the attributes,
    generating a preference vector in the N-dimensional space by using a preference of a user, the preference of the user having a respective value of each of the attributes, the preference vector being a vector arranged in a direction from the origin toward a point defined by the respective value of each of the attributes included in the preference of the user,
    generating, for each of the plurality of items, a first perpendicular line from the each of the plurality of items to the preference vector, and
    selecting a plurality of candidate items from among the plurality of items, the selected plurality of candidate items being a predetermined number of top items determined in order of appearance of the first perpendicular line on the preference vector from an opposite side to the origin in the N-dimensional space;
executing a calculation processing that includes calculating a first distance of the first perpendicular line drawn from a first candidate item to the preference vector, the first candidate item being one of the selected plurality of candidate items;
executing a decision processing in response that the calculated first distance is larger than a threshold, the decision processing including
    selecting a convex hull from among the plurality of items, the convex hull including one or more items of the plurality of items other than the first candidate item,
    generating, for each of the one or more items included in the convex hull, a second perpendicular line from the each of the one or more items included in the convex hull to the preference vector,
    calculating, for each of the one or more items included in the convex hull, a second distance of the second perpendicular line drawn from the each of the one or more items included in the convex hull to the preference vector, the calculated second distance being a value inversely proportional to a degree to which the each of the one or more items matches with the preference of the user,
    calculating, for each of the one or more items included in the convex hull, a third distance from the origin in the N-dimensional space to a first contact point associated with the each of the one or more items included in the convex hull, the first contact point being a point where the preference vector is contacted with the second perpendicular line from the each of the one or more items included in the convex hull, the calculated third distance being a value proportional to a degree to which the each of the one or more items matches with the preference of the user,
    calculating, for each of the one or more items included in the convex hull, an index value by subtracting the second distance from the third distance, and
    deciding a recommendation item from among the one or more items, the decided recommendation item being an item having a highest index value from among index values obtained by the calculating of the index value for the one or more items; and executing a presentation processing that includes in response that the one or more items included in the convex hull is two or more items, obtaining, from among the one or more items included in the convex hull, one or more a presentation items to be presented to the user, the one or more presentation items including one or more items each of which is arranged within a circle-shaped area in the N-dimensional space, the circle-shaped area being an area corresponding to a circle defined by a radius of a predetermined value and by a center point corresponding to the decided recommendation item, and in response to the obtaining of the one or more presentation items, displaying on a screen of a display device, the decided recommendation item or a data set including the decided recommendation item and the obtained one or more presentation items.

7. An item presentation apparatus comprising:

a memory; and a processor coupled to the memory, the processor being configured to execute a selection processing that includes arranging, in a N-dimensional space (N is a number of attributes), each of a plurality of items stored in a memory by using a parameter of each of the attributes associated with the each of the plurality of items, the N-dimensional space being defined by a respective axis corresponding to each of the attributes, the N-dimensional space having an origin being a point where the respective axis corresponding to each of the attributes intersects each other, a value of the respective axis being proportional to a distance from the origin and representing an intensity of a corresponding attribute, each of the plurality of items having a respective value of each of the attributes, generating a preference vector in the N-dimensional space by using a preference of a user, the preference of the user having a respective value of each of the attributes, the preference vector being a vector arranged in a direction from the origin toward a point defined by the respective value of each of the attributes included in the preference of the user, generating, for each of the plurality of items, a first perpendicular line from the each of the plurality of items to the preference vector, and selecting a plurality of candidate items from among the plurality of items, the selected plurality of candidate items being a predetermined number of top items determined in order of appearance of the first perpendicular line on the preference vector from an opposite side to the origin in the N-dimensional space;

execute a calculation processing that includes calculating a first distance of the first perpendicular line drawn from a first candidate item to the preference vector, the first candidate item being one of the selected plurality of candidate items;

execute a decision processing in response that the calculated first distance is larger less than a threshold, the decision processing including selecting a convex hull from among the plurality of items, the convex hull including one or more items of the plurality of items other than the first candidate item, generating, for each of the one or more items included in the convex hull, a second perpendicular line from the each of the one or more items included in the convex hull to the preference vector, calculating, for each of the one or more items included in the convex hull, a second distance of the second perpendicular line drawn from the each of the one or more items included in the convex hull to the preference vector, the calculated second distance being a value inversely proportional to a degree to which the each of the one or more items matches with the preference of the user, calculating, for each of the one or more items included in the convex hull, a third distance from the origin in the N-dimensional space to a first contact point associated with the each of the one or more items included in the convex hull, the first contact point being a point where the preference vector is contacted with the second perpendicular line from the each of the one or more items included in the convex hull, the calculated third distance being a value proportional to a degree to which the each of the one or more items matches with the preference of the user, calculating, for each of the one or more items included in the convex hull, an index value by subtracting the second distance from the third distance, and deciding a recommendation item from among the one or more items, the decided recommendation item being an item having a highest index value from among index values obtained by the calculating of the index value for the one or more items; and execute a presentation processing that includes in response that the one or more items included in the convex hull is two or more items, obtaining, from among the one or more items included in the convex hull, one or more a presentation items to be presented to the user, the one or more presentation items including one or more items each of which is arranged within a circle-shaped area in the N-dimensional space, the circle-shaped area being an area corresponding to a circle defined by a radius of a predetermined value and by a center point corresponding to the decided recommendation item, and in response to the obtaining of the one or more presentation items, displaying on a screen of a display device, the decided recommendation item or a data set including the decided recommendation item and the obtained one or more presentation items.

* * * * *